UNITED STATES PATENT OFFICE.

ALBERT BAUR, OF GISPERSLEBEN, NEAR ERFURT, GERMANY.

PROCESS OF MAKING ARTIFICIAL MUSK.

SPECIFICATION forming part of Letters Patent No. 416,710, dated December 10, 1889.

Application filed April 2, 1889. Serial No. 305,760. (No specimens.)

*To all whom it may concern:*

Be it known that I, ALBERT BAUR, of Gispersleben, near Erfurt, Germany, have invented an Improved Process of Making Artificial Musk, of which the following is a specification.

This invention has for its object to produce a cheap substitute for musk.

Toluol is mixed with the combinations of butane with the halogens—such as butyl chloride, bromide or iodide, which are all equivalents for the purposes of this invention—and is boiled at the return-cooler in conjunction with chloride or bromide of aluminium. The product of the reaction is mixed with water and distilled with steam. The vapors arising between 170° to 200° centigrade are collected and treated with a mixture of fuming nitric acid and sulphuric acid. The product, after being washed with water, is crystallized from alcohol. Yellowish-white crystals are obtained, which smell strongly like musk. If dissolved in alcohol and mixed with a little ammonia or carbonate of ammonium, a liquid is formed which is very similar to the tincture of musk.

What I claim is—

The process of making artificial musk in a crystallized form, which consists in mixing toluol with butyl chloride, diluting the product of the reaction with water, distilling it with steam, treating the vapors with a mixture of fuming nitric and sulphuric acid, and crystallizing the product from alcohol, substantially as specified.

In testimony whereof I have signed my name to this specification in the presence of two subscribing witnesses.

ALBERT BAUR.

Witnesses:
 THEODOR CANZ,
 MAX MATTHAI.